March 4, 1958  C. H. CARR  2,825,210
HEAT EXCHANGE APPARATUS
Filed July 19, 1954  2 Sheets-Sheet 1
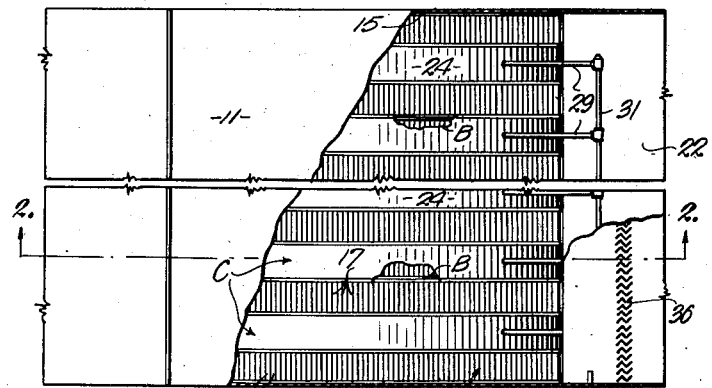
Fig. 1.
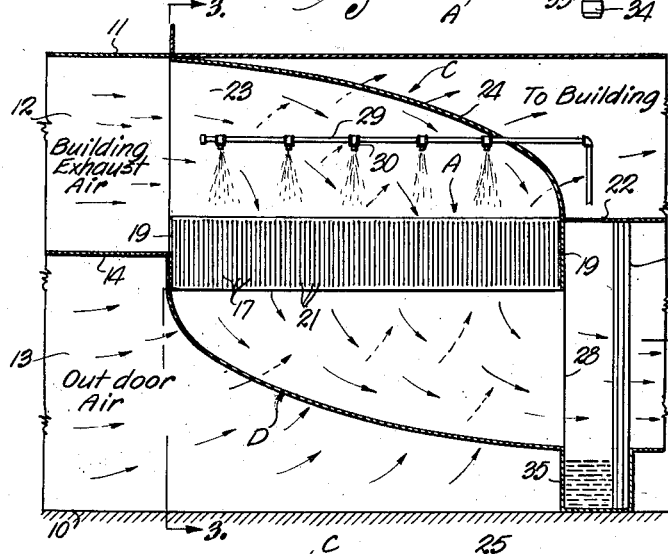
Fig. 2.
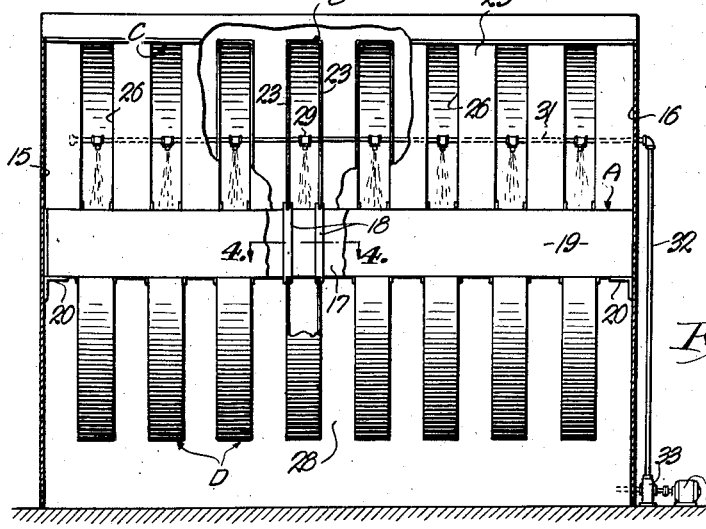
Fig. 3.
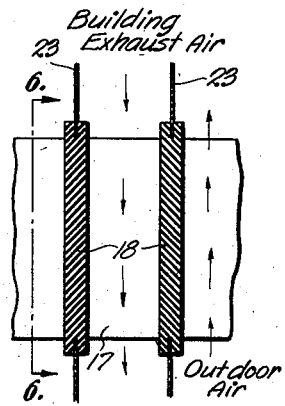
Fig. 5.
Fig. 4.
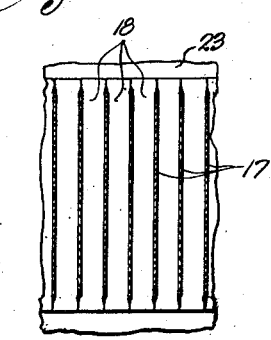
Fig. 6.
INVENTOR.
Clifford H. Carr
BY Thos. E. Scofield
ATTORNEY.

United States Patent Office 2,825,210
Patented Mar. 4, 1958

2,825,210

HEAT EXCHANGE APPARATUS

Clifford H. Carr, Kansas City, Mo.

Application July 19, 1954, Serial No. 444,093

7 Claims. (Cl. 62—139)

This invention relates to the transfer of heat between gaseous or liquid mediums, and refers more particularly to improved apparatus for improving the efficiency of heat transfer in various systems in which such mediums are employed.

A primary object of my invention is to provide an apparatus for improving the cooling capacity of cooling towers such as are used to cool water being circulated from condensers and the like. In the arrangement contemplated by my invention, the air adapted to be contacted with the water spray in the tower is subjected to a pre-cooling step in which its wet bulb temperature is reduced to make it more capable of taking up water by evaporation and thus improving its cooling properties. In the particular apparatus disclosed, this pre-cooling is obtained by taking advantage of the evaporation potential of the atmospheric air, thus making it possible to cool the air without requiring expensive and complex refrigeration equipment.

It is another very important object of my invention to provide apparatus for carrying out the pre-cooling step referred to above which is also readily adaptable to a variety of other uses of equal importance in which heating or cooling of various gases such as air is desired. Reduced to its simplest terms the apparatus disclosed is a heat transfer unit adapted to make possible the efficient transfer of heat between two volumes of a gas at different temperatures, or to produce cooling of an unsaturated gas, such as air, by making use of the ability of the air to evaporate moisture from a wetted surface which is in heat conducting relation with a second surface disposed in the path of that portion of the gas to be cooled.

A further object of the invention is to provide a heat transfer unit of compact and simple construction adapted to provide for the passage therethrough of counterflowing columns of gases which are sealed completely from communication with one another but having continuous heat conducting plates passing from column to column through which a heat transfer can be effected between adjacent columns.

As will be familiar to those versed in the art, the degree of heat transfer from one medium to another in any heat exchanger is generally a function of velocity of the mediums, the temperature differential between the two, and the square feet of surface area available for diffusion of heat to the cooler medium. In the conventional fin-tube exchanger, where the pipe or tube represents primary surface and the fins are secondary surface, it is conventional to circulate a heated liquid through the tubes and to utilize air flow across the fins to dissipate heat from the liquid. However, this type of exchanger, except in instances where there is a sufficiently high temperature differential, has universally been regarded as unsatisfactory for heat exchange between gases, particularly dry air, since the size required for effective heat exchange is so great as to make industrial use impractical. Moreover, in those units in which an air-to-air exchange has been attempted, the necessity of providing sufficient primary surface for effective cooling of the medium flowing through the tubes has resulted in a unit of unwieldly and space-consuming dimensions.

In my invention the problems of primary surface area and size have been solved by providing a unit having a plurality of parallel adjacent conduits with a common wall between each pair thereof, and a plurality of heat conducting plates running transversely through the conduits and passing through the side walls to provide the means for heat transmission from one conduit to another. Means are also provided for establishing counterflowing non-communicating columns of air through adjacent conduits in alternating arrangement across the unit so that the heat exchange will be more effective. An important feature of my invention resides in the sealing off of the mediums from contact with each other so that the moisture content of one is not affected by the other with the result that one medium emerges with not only a reduction in sensible heat but also in total heat. It is also contemplated in situations where dry air is being used as a cooling medium to wet the surfaces of the heat conducting plates disposed in the cooling medium conduits to take advantage of the wet bulb temperature of the dry air, and novel means are provided for this purpose.

A further object of the invention is to provide a heat transfer unit of the character described which is especially suitable for the utilization of conditioned air being exhausted from a building as a preconditioning medium for the outdoor air being drawn into the building. In this connection, it is another object of the invention to provide an arrangement by which this preconditioning can be achieved with ease and simplicity.

Another object of the invention is to provide a heat transfer unit of novel construction which is economical to manufacture and which is rugged and fool-proof in operation.

Other and further objects of the invention together with the features of novelty pertinent thereto will appear in the course of the following description.

In the accompanying drawings which form a part of the instant specification and are to be read in conjunction therewith, and in which like reference numerals indicate like parts of the various views:

Fig. 1 is a top plan view of a preferred embodiment of a unit incorporating the features of my invention, parts being broken away for purposes of illustration and to indicate length;

Fig. 2 is a sectional view taken along the line 2—2 of Fig. 1 in the direction of the arrows;

Fig. 3 is a sectional view taken along the line 3—3 of Fig. 2 in the direction of the arrows, parts being broken away for purposes of illustration;

Fig. 4 is an enlarged sectional view taken along the line 4—4 of Fig. 3 in the direction of the arrows;

Fig. 5 is a sectional view taken along the line 5—5 in the direction of the arrows;

Fig. 6 is a sectional view taken along the line 6—6 of Fig. 5 in the direction of the arrows;

Figure 7:
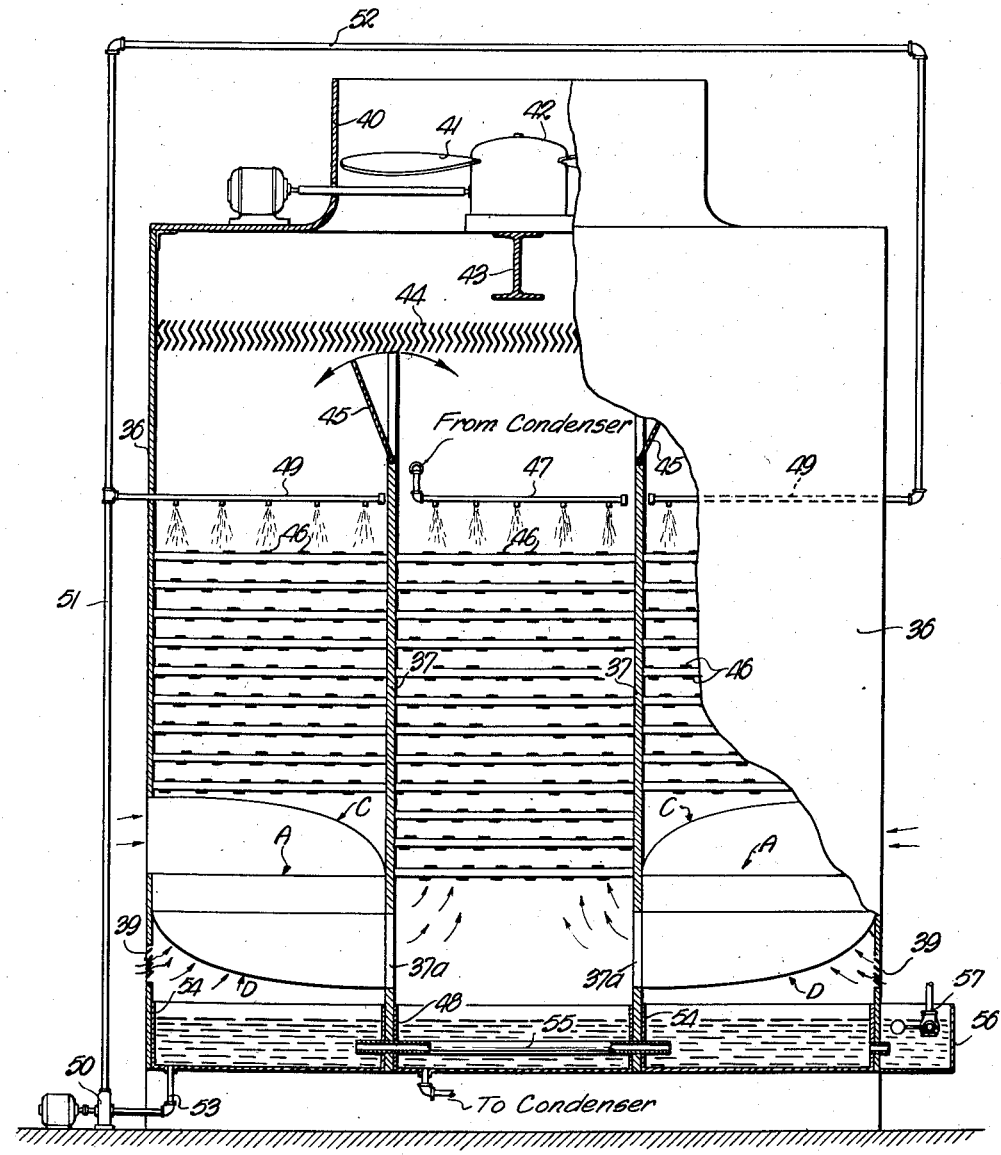
Fig. 7 is an elevational view of a cooling tower employing a modified form of the unit illustrated in Fig. 1, part being broken away for purposes of illustration.

Referring to the drawings and initially to the unit illustrated Figs. 1–6 inclusive, the basic nature of my invention can best be understood by referring first to Fig. 2. As shown in the drawing, reference numerals 10 and 11 indicate respectively the bottom and top walls of an enclosed rectangular main duct which is preferably located in close proximity to the central air conditioning plant of the building (not shown). The left-hand, or outer, end of the duct is divided horizontally into two non-communicating passages, 12 and 13, by means of an intermediate horizontal partition 14, secured at its opposite edges to the respective sidewalls 15 and 16 of the duct. The upper passage 12 is connected with the conventional air return or exhaust duct from the building (not shown) through which air is forced by the conventional blower or fan in the direction shown by the arrows. The lower passage 13 is in communication with the atmosphere, and outdoor air is drawn therethrough in the direction shown by the arrows by a blower or fan which forms a part of the conventional central air-conditioning system (not shown) located beyond that portion of the duct shown in Fig. 2.

As will be understood by those versed in the art, whether the air-conditioning system for the building is being operated under summer or winter conditions, there will be a temperature differential between the air being exhausted from the building (passage 12) and that being drawn from the atmosphere (passage 13). Under summer operating conditions, that is when the air in the building has been artificially cooled, the exhaust air will be at a dry bulb temperature, wet bulb temperature and moisture content lower than that of the incoming outdoor air. Conversely, under winter conditions when the building is being heated, the exhaust air will be at a temperature higher than that of the outdoor air. In the summer this temperature differential may be as much as 25° F. between dry bulb temperatures, and as much as 40° F. between the dry bulb temperature of the outdoor air and the wet bulb temperature of the exhaust air. In the winter these differentials may be considerably more, depending on the climate and season. It is a purpose of my invention to take advantage of these differentials to precondition the outdoor air before it is passed through the central plant without requiring any recirculation of the exhaust air, without affecting the moisture content of the fresh incoming outdoor air, and in a manner more efficient than has been employed in the past.

Positioned centrally in the main duct and in effect forming a continuation of the partition 14, is what will hereinafter be referred to as the heat transfer section of the unit, indicated generally by the letter A. Through means to be hereinafter described, the section A is subdivided into a plurality of separate non-communicating vertical conduits through which the exhaust air is deflected to the lower portion of the main duct, and the outdoor air to the upper portion of the main duct, as shown by the arrows. During the course of the counterflow of the respective volumes of air, a heat transfer is effected between the two and the air to the building is delivered at a temperature different from that at which it entered the unit.

The heat transfer section A comprises generally a prefabricated assembly of parallel vertically disposed metal (preferably copper or aluminum) plates 17, each extending from wall 15 to wall 16 across the main duct, which are bound together in an integral unit suspended in the main duct intermediate the top 11 and bottom 10. Portions of the upper edges of the plates 17, as seen in Fig. 1, are hidden from view by spaced ducts C to be hereinafter described.

Each plate is maintained in spaced relation from its neighbor by a plurality of vertical spacer members 18 formed as elongated rectangular blocks of rubber or other relatively compressible material which are spaced from one another along the length of the plates 17. The spacer members 18 located between successive pairs of plates are aligned with one another and thus form parallel rows B (see Fig. 1) normal to the planes of the plates 17 and substantially parallel with the sidewalls 15 and 16 of the duct. The entire plate assembly with the spacers 18 interposed therebetween is compressed within an open rectangular frame having sides 19 and which is supported within the main duct on shoulders 20 (see Fig. 3) formed by angle members secured in any suitable fashion, for example by welding, to the opposite sidewalls 15 and 16 of the main duct. The length of the frame and the plates 17 is such that the unit completely spans the width of the main duct (see Figs. 1 and 3), and the assembled heat transfer section thus forms a dividing wall between the upper and lower passages 12 and 13 which is honeycombed with a plurality of vertical passageways 21, each open at its upper and lower ends. A second horizontal partition 22 continues on from the end of the plate assembly A to maintain the division of the main duct into upper and lower passages as shown in Fig. 2.

The exchange of heat between the exhaust air and the outdoor air is accomplished by passing the respective air volumes selectively through the vertical passageways 21 between the plates in counterflow relation. The outdoor air passes upwardly through the plate assembly in one set of passageways 21 while the exhaust air is deflected downwardly through the unit in another and separate set.

The building exhaust air from passageway 12 is directed into its set of passageways by a plurality of spaced guide ducts C located on top of the plate assembly and secured thereto in a manner to be hereinafter described. Ducts C are shown in top plan in Fig. 1, in side section in Fig. 2, and as looking toward their open ends in Fig. 3. Each of the ducts C comprises a pair of spaced vertical sidewalls 23 having arcuate upper edges connected throughout their length by a curved crosswall 24 and horizontal lower edges which rest upon the upper edges of the plates in the plate assembly. As shown the ducts C are disposed longitudinally within the main duct and the walls 23 thereof extend across the plate assembly in directions normal to the planes of the plates 17. Each duct is equal in width to the lateral spacing between the spacer members 18 (see Figs. 3 and 5), and the ducts are so located across the top of the plate assembly that they cover alternate ones of the parallel groups of passageways 21 defined by the rows B of spacers 18. As is best seen from Figs. 3, 5, and 6, the lower, horizontal edges of the curved ducts C are joined to the plate assembly by inserting them in slits or notches cut into the ends of the spacers 18, which extend for a short distance above and below the plates 17. Preferably, a suitable adhesive is first inserted in the slits formed in the spacers so that the resulting joints will be secure.

From the description this far, it will be understood that the individual ducts C together with the vertical passageways 21 through the plate assembly A which they cover form independent isolated conduits through which the building exhaust air travels downwardly through the plate assembly. The building exhaust air is prevented from entering the spaces between the ducts C by a vertical partition 25 disposed transversely across the passage 12 ahead of the ducts. As shown in Fig. 3, the partition 25 is a sheet-like element inserted through a slot in the top wall 11 of the main duct and provided at spaced intervals with U-shaped openings having edges 26 which conform in size and register with the open ends of the ducts C. The partition 25 is secured at its upper end and side edges to the top and sidewalls respectively of the building exhaust duct 12, and along its lower edge to the forward face of the frame 19 for the plate assembly A.

The building exhaust air, after passing downwardly through the plate assembly A, is directed by a second series of curved ducts D to the area from whence it is exhausted to the atmosphere. The ducts D are identical in construction with the ducts C, each having vertical sidewalls 26 connected along their curved edges by an arcuate web 27. As is best seen in Fig. 3, the ducts D are aligned vertically with the ducts C so that they form a continuation of the conduits provided by the ducts C and the communicating passages 21 in the plate assembly. The edges of the ducts D adjacent the lower surface of the plate assembly are received in slits cut into the projecting ends of the spacers 18 and are secured therein by a suitable adhesive. A vertical partition plate 28 is secured to the walls of the lower passage 13 across the ends of the ducts C, and like the partition 25 is provided with U-shaped cutouts which register with the open ends of the ducts.

It will be now evident that the ducts C and D together with the intermediate passages in the plate assembly A connected therewith provide a plurality of spaced conduits through which the building exhaust air travels from the upper passage 12 to the point at which it is exhausted to the atmosphere. On the other hand, the incoming outdoor air from passage 13 flows upwardly between the ducts D and through the plate assembly A in passages which lie adjacent but do not communicate in any way with the building exhaust air passages. A visual appreciation of this counterflow relationship may perhaps be aided by referring particularly to Fig. 1. The outdoor air from the lower passage 13 (see Fig. 2) is rising through the plate assembly in the passages where the edges of the plate are visible, i. e., between the confronting sidewalls of adjacent ducts C, while the building exhaust air is flowing downwardly in those passages covered by the ducts C. The air flow through the plate assembly is thus in side-by-side vertical columns, each column being of equal length with the length of the plate assembly in the direction normal to the disposition of the plates. The width of the upflowing or outdoor column is equal to the spacing between adjacent ducts C or between the outside walls of the outer ducts and the sidewalls 15 or 16 of the main duct. The width of the downflowing columns is equal to the width of each duct C.

The spacers 18 provide the necessary seal between adjacent columns so that there is no communication of air from one column to the other. However, it will be noted that each individual plate 17 passes continuously from column to column, and thus provides a large surface area which is contacted by the air in the respective columns. The large number of these plates, each of which passes without interruption into the adjacent counterflowing column, makes it possible to obtain an efficient and relatively complete heat exchange between the columns without any change in the moisture content of either. The heat is transmitted from one column to the other through the conductivity of the plates 17, and the exchange is effected without causing any moisture loss or gain in the transfer.

In the specific embodiment of the invention illustrated in Figs. 1 and 2, means are also provided for wetting the surfaces of the plates over which the building exhaust air passes. Extending into the interior of each upper duct C through its curved web 24 is a water pipe 29 fitted along its length with spray nozzles 30. The pipes 29 are connected through suitable fittings with a cross pipe 31 extending transversely across the main duct. The cross pipe 31 is connected with a vertical supply pipe 32. Water is delivered to pipe 32 and to the sprays 30 by pump 33 driven by motor 34, which withdraws accumulated water from a reservoir 35 at the bottom of the main duct. It will be noted that reservoir 35 is disposed beneath the open end of the duct D to catch the water after it passes through the plate assembly A. An eliminator 36 is also disposed across the path of the air leaving the unit to collect entrained moisture and return it to the reservoir.

It will be understood that the unit shown and described is capable of operation without employing the water spray. However, by wetting the surfaces of the plates over which the exhaust air is passed, it is possible, due to the evaporation from the wetted surface to obtain a greater temperature differential in the plates 17 between the adjacent counterflowing columns. Under summer conditions, where the exhaust air is being used to cool the incoming outdoor air, the relative dryness of the exhaust air can be utilized to great advantage by wetting the plate area in the downflowing column. However, under winter conditions where the exhaust air is employed to heat the incoming air, the spray will not be used.

The operation of the embodiment disclosed in Figs. 1–6, inclusive, is believed evident from the foregoing description. As the incoming outdoor air passes through the heat transfer A, heat is removed through the plates and carried away in the relatively cooler air being exhausted from the building. The moisture content of the outdoor air remains unchanged and it is delivered to the building with a reduced total heat, which is in effect the result of a refrigeration operation carried out in the heat transfer section A. Any subsequent treatment, whether by way of evaporative cooling or by additional refrigeration can thus be accomplished at a lower cost and with greater efficiency.

Fig. 7 illustrates the form of my invention wherein a more effective cooling of the circulating water in a conventional cooling tower is obtained. Reference numeral 36 indicates the outer walls of a hollow cooling tower divided into three zones by internal vertical partitions 37 extending completely across the inside of the tower. Mounted in each of the outside zones, near the lower ends thereof are heat transfer sections A, each identical in construction with that shown in Figs. 1–6, inclusive, and hereinbefore described. These heat transfer sections, it will be understood, are of equal length and width with the side enclosures and thus extend from side wall to side wall in either direction. Each heat transfer section is provided with the upper ducts C and lower ducts D. Ducts C communicate with the air outside the tower through apertures 36a in the side walls, and ducts D communicate with the lower end of the central zone or enclosure formed between partitions 37 through apertures 37a provided therein. A second aperture 39 is located in each side wall 36 below the plate assembly A for ingress of outside air to the side zones.

To draw air into the tower and upwardly through the respective zones, mounted on top of the tower in throat 40 is a fan 41 driven by motor 42. The fan is supported on a cross-beam 43 as in conventional towers. A water eliminator 44 is provided below the fan. Below the eliminator, each partition 37 is provided with an opening controlled by a hinged gate 45 which can be swung to increase or decrease the flow of air therethrough.

Each of the three zones of the tower is preferably provided with slatted decking as indicated at 46. The central zone has located near its upper end the spray pipe system 47 which is supplied with water from the condenser coil in the circulating system (not shown) for which the tower is being utilized. At the bottom of the central enclosure is a collecting pan 48 from which the water after it descends through the central enclosure is returned to the circulating system for use in further cooling. It will be understood that the details of construction of the central enclosure except for the connection of the ducts D therewith can be in accordance with any accepted principles of tower design and that neither the details thereof nor the details of the circulating system in itself form any part of my invention.

The side zones or enclosures of the tower are fitted with water spray pipes 49 which form a part of and are supplied by a circulating system completely independent of the water being cooled in the central zone of the tower. Water is supplied to the pipes 49 by a pump 50 through lines 51 and 52. The intake side of the pump is connected by a line 53 with a collecting pan 54 mounted in the bottom of the left-hand side enclosure. A similar pan 54 is mounted in the bottom of the right-hand enclosure, and maintaining the two pans in constant communication is a cross pipe 55 which passes through the central zone. The conventional cold water make-up reservoir 56 communicates with pan 54. A water pipe 57 connected with the city supply system discharges into make-up reservoir 56, the discharge being under the control of a float valve which opens when the level of water in the pans 55 recedes below a predetermined level.

The operation of the unit illustrated in Fig. 7 is as follows: Fan 41 induces an upward draft in the central zone, thus drawing outside air in through the duct C downwardly through the plate assembly A and into the central zone through ducts B. At the same time an upward draft is induced in the side zones or enclosures causing outside air to enter the side zones below the plate assembly A through the apertures 39. This air flows upwardly through the plate assembly in counterflow relation with the air being drawn to the central enclosure as was described in connection with the embodiment shown in Figs. 1–6, inclusive. There are thus established adjacent counterflowing columns of air in the heat transfer sections A, the upflowing columns entering the open lower ends of the conduits between the spaced ducts D and being discharged from the upper ends of those selfsame conduits which are open and located between the upper ducts C. The plate surfaces in the plate assembly A over which the upwardly flowing columns of air pass are continually wetted by the water from spray pipes 49. The up-flowing air, as it passes over the wetted plates, evaporates a portion of the moisture therefrom thus causing the plates to assume a temperature near the wet bulb and lower than the dry bulb temperature of the air entering through duct C, and cooling and lowering of the wet bulb temperature of the downflowing columns which are delivered to the central enclosure is thus obtained. As has been hereinbefore described, the heat transfer takes place through the continuous plates passing from column to column, and there is no change in the moisture content of the air which is delivered to the central enclosure.

By passing the air discharged from the upper end of the heat transfer sections A through the water descending in the side enclosures from pipes 49, a cooling of the water is obtained. This cool or cold water adds to the removal of heat from the incoming air since it is at a temperature near the wet bulb and lower than the dry bulb atmospheric air. It will be noted that the water, after passing through the heat transfer sections A, is collected in pans 54 and recirculated to the spray pipes 49 by pump 50. Any loss by evaporation is replaced through the make-up reservoir 56.

The precooling of the outside air before it is introduced into the central zone of the tower to contact the spray descending therethrough makes it possible to remove far more heat from the water under a given set of atmospheric conditions than is possible in conventional towers. This results in the ability to obtain the same degree of cooling with a much smaller tower than has been possible in the past, or alternatively, an increase in cooling capacity in any given tower. In many instances, the normal prevailing atmospheric conditions in some localities make it impossible to utilize cooling towers with any success. In my invention, however, the step of withdrawing heat from the incoming air without changing its moisture content increases the capacity of the air absorption when it is brought in contact with the water, and often can make a tower operate to practical advantage in a locality otherwise unsuitable for tower use.

An additional advantage afforded by my invention is in the increased cooling capacity which is provided by the precooling step. As is familiar to those versed in the art, the amount of cooling that can be obtained in any conventional tower is in the last analysis governed by atmospheric conditions. As a result, in localities where these conditions are unfavorable, there is a definite limit on the amount of cooling that can be obtained with the conventional cooling tower, even assuming maximum tower efficiency. As a result, where a greater degree of cooling than can be provided in a tower is required, for example in certain chemical processes, it has in the past been necessary to adopt some other more expensive type of cooling equipment, such as a compressor type refrigeration system. However, by the use of my invention, it is possible in many cases to increase the cooling capacity of a tower to a point where it can be effectively used, thus eliminating the necessity for employing the more expensive refrigeration.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A cooling tower for withdrawing heat from the liquid in a circulatory liquid cooling system in which heat is continually added to the liquid in the system comprising a first enclosure open at its upper end, means for discharging the heated liquid from such system into the upper end of said enclosure for substantially free fall downwardly through said enclosure, withdrawal means at the bottom of said enclosure for returning said liquid to said system, an air inlet near the bottom of said enclosure, air draft means associated with said enclosure for causing air to enter through said inlet and exhaust at the upper end of said enclosure whereby the air passes through said enclosure in counterflow relation with the water, and air cooling means ahead of said inlet for lowering the temperature of the air without increasing its moisture content, said air cooling means comprising a heat transfer unit having a passageway open at one end to the atmosphere and connected at the other end with said inlet, at least one transverse heat conductor plate disposed longitudinally of said passageway, a portion of said plate being within said passageway and a second portion being exposed to the space outside said passageway, the plate being received through the wall of said passageway in sealed relationship, means for wetting the second portion of said plate, and means for flowing atmospheric air over said wetted portion.

2. In a heat transfer device of the character described, a conduit, a heat conductor plate disposed longitudinally of said conduit and extending through the wall thereof so that a first portion of said plate projects inwardly into said conduit with both sides exposed to flow through said conduit and a second portion extends outwardly beyond the exterior of said conduit, means for flowing a fluid longitudinally through said conduit to contact the opposite sides of said first portion, and means for flowing a second fluid in a direction substantially parallel with the flow of said first fluid along the exterior of said conduit to contact said second portion of said plate.

3. In a heat transfer device of the character described, a hollow body open at opposite ends and longitudinally subdivided into at least two parallel adjacent conduits having a common wall, a heat conductor plate disposed longitudinally within said body and having a first portion disposed in one of said conduits with both sides exposed to flow therethrough and a second portion disposed in the other of said conduits with both sides exposed to flow therethrough, said plate passing through said common wall, means for flowing a first fluid through one of said conduits, and means for flowing a second fluid through the other of said conduits.

4. In a heat transfer device of the character described, a hollow body open at opposite ends and longitudinally subdivided into at least two parallel adjacent conduits of a length equal to the length of said body separated by a common wall, a plurality of heat conductor plates located within said body and aligned longitudinally with said conduits, each of said plates passing transversely through said wall and having a first portion disposed in one conduit and a second portion in the other conduit, means for flowing a first stream of gas through one of said conduits in a predetermined direction, and means for flowing a second stream of gas having a temperature different from that in said first stream through the other of said conduits in a direction opposite to that of said first stream thereby to effect a heat transfer between the two streams through said plates.

5. A heat transfer device as in claim 4 including means for continually wetting the exposed portions of said plates in one of said conduits.

6. In a heat transfer system of the character described, a heat transfer action comprising a plate assembly including a plurality of spaced parallel vertically disposed heat conducting plates of generally similar dimensions, spacers disposed within said section and between said plates to subdivide said plate assembly into a plurality of adjacent, parallel, vertical conduits open at their upper and lower ends, said spacers being arranged in parallel rows extending across said plate assembly in a direction transverse to the planes of said plates whereby each plate member passes successively from conduit to conduit, a first air passage in communication individually with one end of each of alternate ones of said conduits, a second air passage in communication with the opposite end of each of the intermediate conduits between said alternate conduits, means for flowing air from each of said passages through said conduits simultaneously whereby said air passes through said heat transfer section in sets of alternate counterflowing columns defined by the respective conduits, and means for delivering the columns of air flowing through one set of said conduits to a predetermined point.

7. A heat transfer system as in claim 6 including means for wetting the surfaces of said plates and the other set of said conduits.

References Cited in the file of this patent
UNITED STATES PATENTS

| | | |
|---|---|---|
| 1,409,520 | Bird | Mar. 14, 1922 |
| 1,825,498 | Wogan | Sept. 29, 1931 |
| 2,368,814 | Fagan | Feb. 6, 1945 |
| 2,414,135 | Berlowitz | Jan. 15, 1947 |
| 2,627,396 | Simons | Feb. 3, 1953 |
| 2,634,959 | Cave | Apr. 14, 1953 |